United States Patent
Iwamura et al.

(10) Patent No.: US 8,725,159 B2
(45) Date of Patent: May 13, 2014

(54) MOBILE COMMUNICATION SYSTEM

(75) Inventors: Mikio Iwamura, Tokyo (JP); Hiroyuki Ishii, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 13/520,916

(22) PCT Filed: Jan. 7, 2011

(86) PCT No.: PCT/JP2011/050185
§ 371 (c)(1),
(2), (4) Date: Sep. 25, 2012

(87) PCT Pub. No.: WO2011/083848
PCT Pub. Date: Jul. 14, 2011

(65) Prior Publication Data
US 2013/0012213 A1    Jan. 10, 2013

(30) Foreign Application Priority Data
Jan. 8, 2010    (JP) .............................. P2010-003423

(51) Int. Cl.
*H04W 40/00* (2009.01)
*H04W 72/00* (2009.01)
*H04W 4/00* (2009.01)

(52) U.S. Cl.
USPC ........................... 455/450; 455/447; 370/329

(58) Field of Classification Search
CPC ................................................ H04W 72/0453
USPC .......................... 455/450–454, 455, 446–449; 370/328–330, 343
See application file for complete search history.

(56) References Cited

U.S. PATENT DOCUMENTS

2007/0297385 A1    12/2007    Ishizu et al.
2009/0316659 A1 *  12/2009    Lindoff et al. ................ 370/332

FOREIGN PATENT DOCUMENTS

| EP | 1791377 A1 | 5/2007 |
| JP | 06-350515 A | 12/1994 |
| JP | 2006-197264 A | 7/2006 |
| JP | 2007-151120 A | 6/2007 |
| WO | 2006/092856 A1 | 9/2006 |
| WO | WO 2010/490006 A1 * | 5/2010 |

OTHER PUBLICATIONS

3GPP TR 36.814 V1.5.0, Nov. 2009, "3rd Generation Partnership Project; Technical Specification Group Radio Access Network; Further Advancements for E-UTRA; Physical Layer Aspects (Release 9)," 53 pages.

(Continued)

*Primary Examiner* — George Eng
*Assistant Examiner* — Nam Huynh
(74) *Attorney, Agent, or Firm* — Osha Liang LLP

(57) ABSTRACT

A mobile communication system according to the present invention is a mobile communication system, in which a mobile station UE is configured to transmit and receive a signal to/from a radio base station eNB simultaneously using a first carrier of a frequency band F1 and a second carrier of a frequency band F2 higher than the frequency band F1, that is, the mobile station UE is configured to perform CA, wherein the radio base station eNB is configured to manage a cell #11 using the first carrier and a cell #21 using the second carrier, a coverage area of the cell #11 and a coverage area of the cell #21 are configured to be geographically superimposed with each other, and the coverage area of the cell #11 is configured to be larger than the coverage area of the cell #21.

5 Claims, 4 Drawing Sheets

(56) References Cited

OTHER PUBLICATIONS

3GPP TR 36.912 V9.1.0, Dec. 2009, "3rd Generation Partnership Project; Technical Specification Group Radio Access Network; Feasibility study for Further Advancements for E-UTRA (LTE-Advanced) (Release 9)," 58 pages.

Office Action mailed Mar. 8, 2011 in corresponding Japanese Application No. 2010-003423, with translation, 6 pages.
International Search Report issued in PCT/JP2011/050185, mailed on Mar. 15, 2011, with translation, 4 pages.

\* cited by examiner

MOBILE COMMUNICATION SYSTEM

TECHNICAL FIELD

The present invention relates to a mobile communication system.

BACKGROUND ART

In a mobile communication system employing an LTE (Long Term Evolution)-Advanced scheme for which the 3GPP is developing a standardization, performing "CA (Carrier Aggregation)" has been discussed.

When the CA is being performed, a mobile station UE is configured to transmit uplink signals using a plurality of "Component Carriers (CCs)" having different frequency bands to a radio base station eNB.

Therefore, in the LTE-Advanced mobile communication system, it is considered that coverage areas of cells #11, #12, and #13 using CC of a frequency band F1 and coverage areas of cells #21, #22, and #23 using CC of a frequency band F2 are configured to be geographically superimposed with each other with the same size as shown in FIG. 4.

However, when a 2 GHz band is used as the frequency band F1 and a 3.5 GHz band is used as the frequency band F2, since the propagation characteristics of CC of the 3.5 GHz band are lower than the propagation characteristics of CC of the 2 GHz band, there is a problem that it becomes difficult to make equal to each other, the size of a coverage area of a cell using the CC of the 2 GHz band and the size of a coverage area of the cell using the CC of the 3.5 GHz band.

Particularly, there is a problem that a larger propagation attenuation occurs in a high frequency band such as a 3.5 GHz band or a 4.9 GHz band as compared with a frequency band such as a 2 GHz band generally used in a cellular system, and when it is assumed that the reception sensitivity of a mobile station UE is constant, a deterioration of about 4 dB to 10 dB occurs in terms of link budget. Therefore, in case of using the high frequency band such as the 3.5 GHz band or the 4.9 GHz band, there is a problem of not being able to guarantee a coverage, and there is also a problem of not being able to guarantee mobility.

For example, when a mobile station UE moves during communication using a carrier of the 3.5 GHz band, there is a problem that the mobile station UE may easily enter an area not covered with the carrier of the 3.5 GHz band, a handover may fail, or a call may be interrupted.

In order to solve these problems, it is considered to increase the density of a cell using the high frequency band such as the 3.5 GHz band or the 4.9 GHz band by increasing the number of radio base stations eNB; however, this leads to a problem that there occurs an increase in a network configuration cost.

SUMMARY OF THE INVENTION

Therefore, the present invention has been achieved in view of the above-described problems, and an object thereof is to provide a mobile communication system having a suitable configuration in which a high frequency band such as a 3.5 GHz band or a 4.9 GHz band can be effectively used by applying CA.

A first characteristic of the present embodiment is summarized in that a mobile communication system, in which a mobile station is configured to transmit and receive a signal to/from a radio base station simultaneously using a first carrier of a first frequency band and a second carrier of a second frequency band higher than the first frequency band, in which the radio base station is configured to manage a first cell using the first carrier and a second cell using the second carrier, a coverage area of the first cell and a coverage area of the second cell are configured to be geographically superimposed with each other, and the coverage area of the first cell is configured to be larger than the coverage area of the second cell.

As described above, according to the present invention, it is possible to provide a mobile communication system having a suitable configuration in which a high frequency band such as a 3.5 GHz band or a 4.9 GHz band can be effectively used by applying CA.

DESCRIPTION OF EMBODIMENTS (Mobile Communication System According to First Embodiment of the Present Invention)

Figure 1:
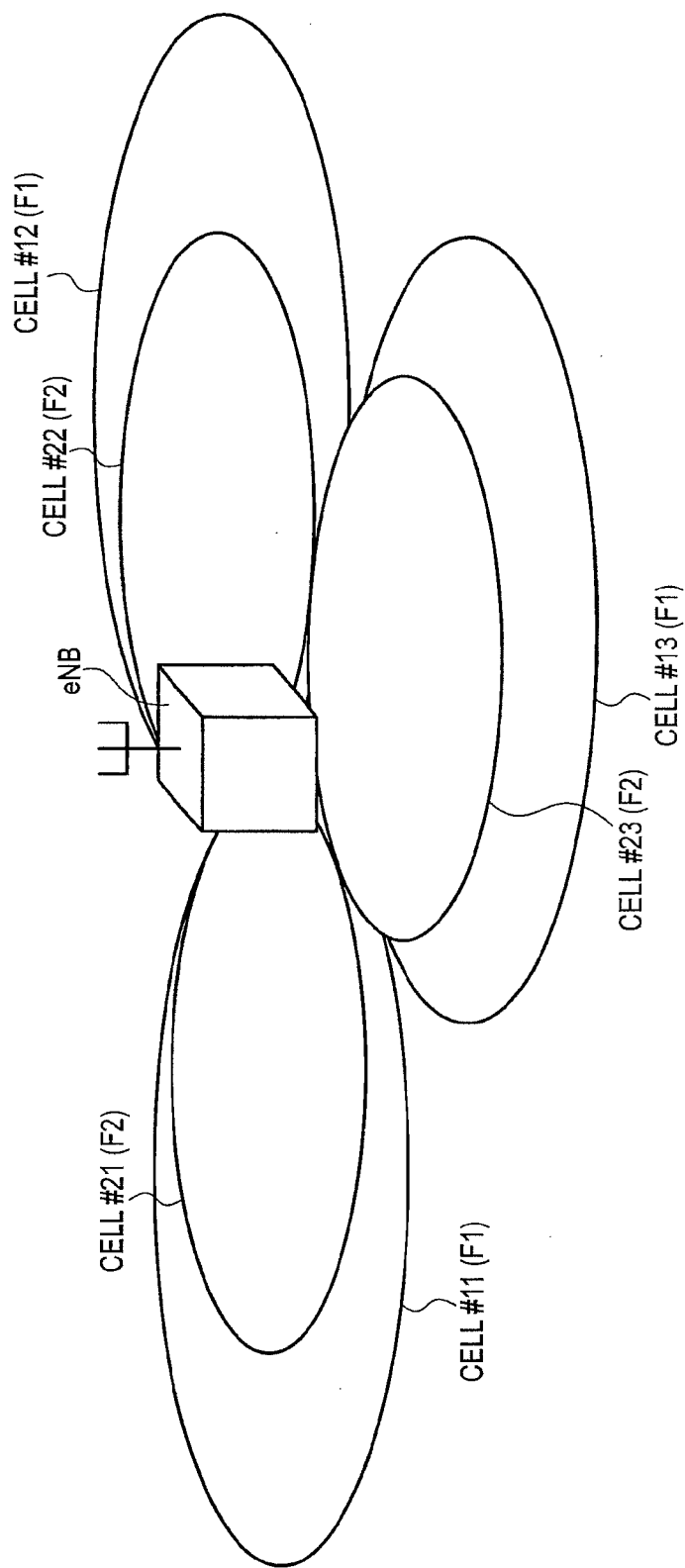
FIG. 1 is a diagram showing the entire configuration of a mobile communication system according to a first embodiment of the present invention.

With reference to FIG. 1, a mobile communication system according to a first embodiment of the present invention will be described. The mobile communication system according to the present embodiment is an LTE-Advanced mobile communication system.

Note that in the mobile communication system according to the present embodiment, a mobile station UE is configured to transmit and receive a signal to and from a radio base station eNB simultaneously using CC of a frequency band F1 and CC of a frequency band F2, that is, configured to perform CA.

As illustrated in FIG. 1, in the mobile communication system according to the present embodiment, subordinate to the radio base station eNB, a cell #11, a cell #12, a cell #13, a cell #21, a cell #22, a cell #23 and the like are provided as macro cells.

The CC of the frequency band F1 is used in the cell #11, the cell #12, and the cell #13, and the CC of the frequency band F2 is used in the cell #21, the cell #22, and the cell #23.

In the LTE-Advanced mobile communication system, for example, it is considered that the frequency bands F1 and F2 use a 800 MHz band, a 1.5 GHz band, a 1.7 GHz band, a 2 GHz band, a 3.4 GHz band to a 3.6 GHz band, a 4.4 GHz band to a 4.9 GHz band and the like.

Furthermore, for example, a bandwidth of each "Component Carrier" may be 6 RB (Resource Block), 15 RB, 25 RB, 50 RB, 75 RB, or 100 RB. Note that 1 RB corresponds to 180 kHz.

Furthermore, in the mobile communication system according to the present embodiment, a coverage area of the cell #11 and a coverage area of the cell #21 are configured to be geographically superimposed with each other, a coverage area of the cell #12 and a coverage area of the cell #22 are configured to be geographically superimposed with each other, and a coverage area of the cell #13 and a coverage area of the cell #23 are configured to be geographically superimposed with each other.

Note that in the mobile communication system according to the present embodiment, the frequency band F1 is set to be higher than the frequency band F2, the coverage area of the cell #11 is configured to be larger than the coverage area of the cell #21, the coverage area of the cell #12 is configured to be larger than the coverage area of the cell #22, and the coverage area of the cell #13 is configured to be larger than the coverage area of the cell #23.

Furthermore, in the mobile communication system according to the present embodiment, the same PCI (Physical Cell Identity) is configured to be used in the cell #11 and the cell #21 having the superimposed coverage areas, the same PCI is configured to be used in the cell #12 and the cell #22 having the superimposed coverage areas, and the same PCI is configured to be used in the cell #13 and the cell #23 having the superimposed coverage areas.

Alternatively, in the mobile communication system according to the present embodiment, different PCIs may be configured to be used in the cell #11 and the cell #21 having the superimposed coverage areas, the different PCIs may be configured to be used in the cell #12 and the cell #22 having the superimposed coverage areas, and the different PCIs may be configured to be used in the cell #13 and the cell #23 having the superimposed coverage areas.

In the mobile communication system according to the present embodiment, it is possible for the mobile station UE to perform CA only in an area where the coverage area of the cell #11 and the coverage area of the cell #21 are superimposed with each other, an area where the coverage area of the cell #12 and the coverage area of the cell #22 are superimposed with each other, and an area where the coverage area of the cell #13 and the coverage area of the cell #23 are superimposed with each other.

Meanwhile, in the mobile communication system according to the present embodiment, the mobile station UE is configured to perform communication using only the CC of the frequency band F1, that is, configured not to perform the CA in a coverage area of the cell #11 where the coverage area of the cell #21 is not superimposed, a coverage area of the cell #12 where the coverage area of the cell #22 is not superimposed, and a coverage area of the cell #13 where the coverage area of the cell #23 is not superimposed.

In accordance with the mobile communication system according to the first embodiment of the present invention, while considering the propagation characteristics of CC of each frequency band, in areas where the coverage areas of the cells #11, #12, and #13 and the coverage areas of the cells #21, #22, and #23 are superimposed with each other, it is possible to achieve high throughput by the CA and to ensure wide coverage areas by the cells #11, #12, and #13 using the CC of the frequency band F1.

(Mobile Communication System According to Second Embodiment of the Present Invention)

Figure 2:
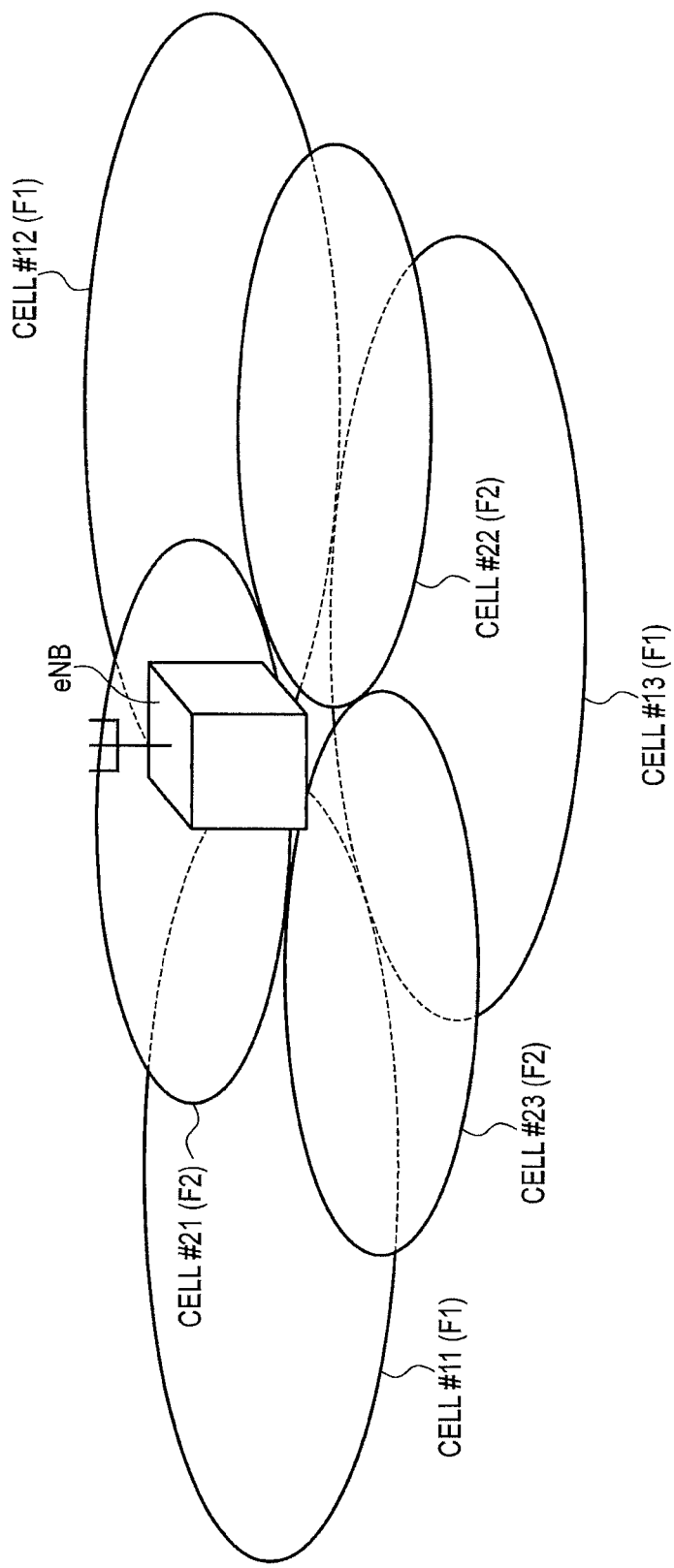
FIG. 2 is a diagram showing the entire configuration of a mobile communication system according to a second embodiment of the present invention.

With reference to FIG. 2, the mobile communication system according to a second embodiment of the present invention will be described. Hereinafter, the mobile communication system according to the present embodiment will be described by focusing on a difference from the mobile communication system according to the first embodiment of the present invention.

As illustrated in FIG. 2, in the mobile communication system according to the present embodiment, similarly to the mobile communication system according to the first embodiment of the present invention, subordinate to the radio base station eNB, the cell #11, the cell #12, the cell #13, the cell #21, the cell #22, a cell #23 and the like are provided as macro cells.

Furthermore, in the mobile communication system according to the present embodiment, a coverage area of the cell #11 is configured to be geographically superimposed with a coverage area of the cell #21 and a coverage area of the cell #23, a coverage area of the cell #12 is configured to be geographically superimposed with the coverage area of the cell #21 and a coverage area of the cell #22, and a coverage area of the cell #13 is configured to be geographically superimposed with the coverage area of the cell #22 and the coverage area of the cell #23.

That is, in the mobile communication system according to the present embodiment, the coverage areas of the cells #11, #12, and #13, are not exactly the same as the coverage areas of the cells #21, #22, and #23.

Specifically, in the mobile communication system according to the present embodiment, the radio base station eNB adjusts so that a main lobe direction of a communication antenna in the cell #11 is different from a main lobe direction of a communication antenna in the cell #21.

Furthermore, in the mobile communication system according to the present embodiment, the radio base station eNB adjusts so that a main lobe direction of a communication antenna in the cell #12 is different from a main lobe direction of a communication antenna in the cell #22.

Moreover, in the mobile communication system according to the present embodiment, the radio base station eNB adjusts so that a main lobe direction of a communication antenna in the cell #13 is different from a main lobe direction of a communication antenna in the cell #23.

Furthermore, in the mobile communication system according to the present embodiment, different PCIs may be configured to be used in the cell #11 and the cell #21 having the superimposed coverage areas, the different PCIs may be configured to be used in the cell #12 and the cell #22 having the superimposed coverage areas, and the different PCIs may be configured to be used in the cell #13 and the cell #23 having the superimposed coverage areas.

Alternatively, in the mobile communication system according to the present embodiment, the same PCI may be configured to be used in the cell #11 and the cell #21 having the superimposed coverage areas, the same PCI may be configured to be used in the cell #12 and the cell #22 having the superimposed coverage areas, and the same PCI may be configured to be used in the cell #13 and the cell #23 having the superimposed coverage areas.

Furthermore, in the mobile communication system according to the present embodiment, it is possible for the mobile station UE to perform CA only in an area where the coverage area of the cell #11 and the coverage areas of the cells #21 and #23 are superimposed with each other, an area where the coverage area of the cell #12 and the coverage areas of the cells #21 and #22 are superimposed with each other, and an area where the coverage area of the cell #13 and the coverage areas of the cells #22 and #23 are superimposed with each other.

For example, in an area where the coverage area of the cell #13 and the coverage area of the cell #22 are superimposed with each other, it is possible for a mobile station UE visiting the cell #13 to perform the CA using the CC #13 used in the cell #13 and the CC #22 used in the cell #22, and in an area where the coverage area of the cell #13 and the coverage area of the cell #23 are superimposed with each other, it is possible for the mobile station UE visiting the cell #13 to perform the CA using the CC #13 used in the cell #13 and the CC #23 used in the cell #23.

Meanwhile, in the mobile communication system according to the present embodiment, the mobile station UE is configured to perform communication using only the CC of the frequency band F1, that is, configured not to perform the CA in a coverage area of the cell #11 where the coverage areas of the cells #21 and #23 are not superimposed, a coverage area of the cell #12 where the coverage areas of the cells #21 and #22 are not superimposed, and a coverage area of the cell #13 where the coverage areas of the cells #22 and #23 are not superimposed.

In accordance with the mobile communication system according to the second embodiment of the present invention, while considering the propagation characteristics of CC of each frequency band, in areas where the coverage areas of the cells #11, #12, and #13 and the coverage areas of the cells #21, #22, and #23 are superimposed with each other, it is possible to achieve high throughput by the CA and to ensure wide coverage areas by the cells #11, #12, and #13 using the CC of the frequency band F1.

Furthermore, in accordance with the mobile communication system according to the second embodiment of the present invention, since the main lobe of the CC in another cell is directed toward a boundary area of a certain cell, the cells are complemented to each other, so that it is possible to improve throughput in a boundary area of each cell.

(Mobile Communication System According to Third Embodiment of the Present Invention)

Figure 3:
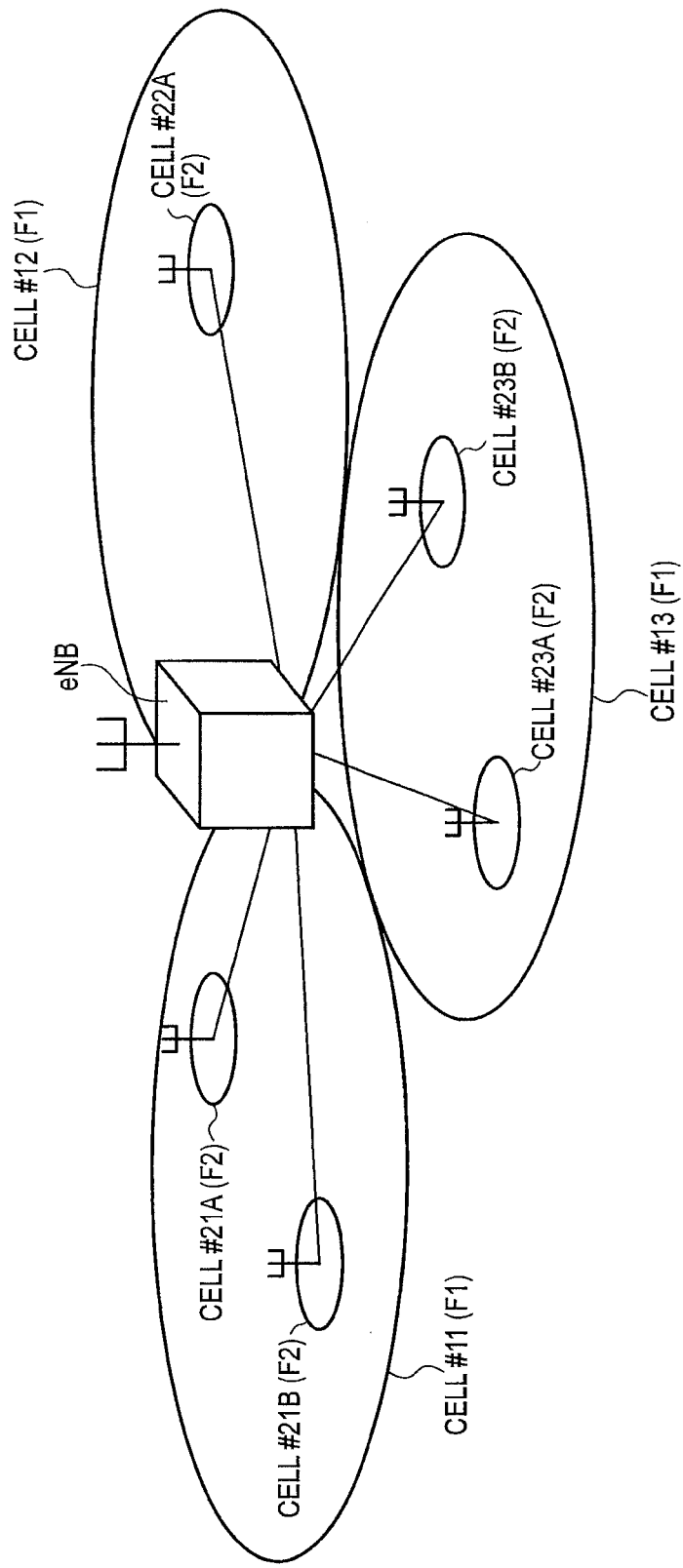
FIG. 3 is a diagram showing the entire configuration of a mobile communication system according to a third embodiment of the present invention.
Figure 4:
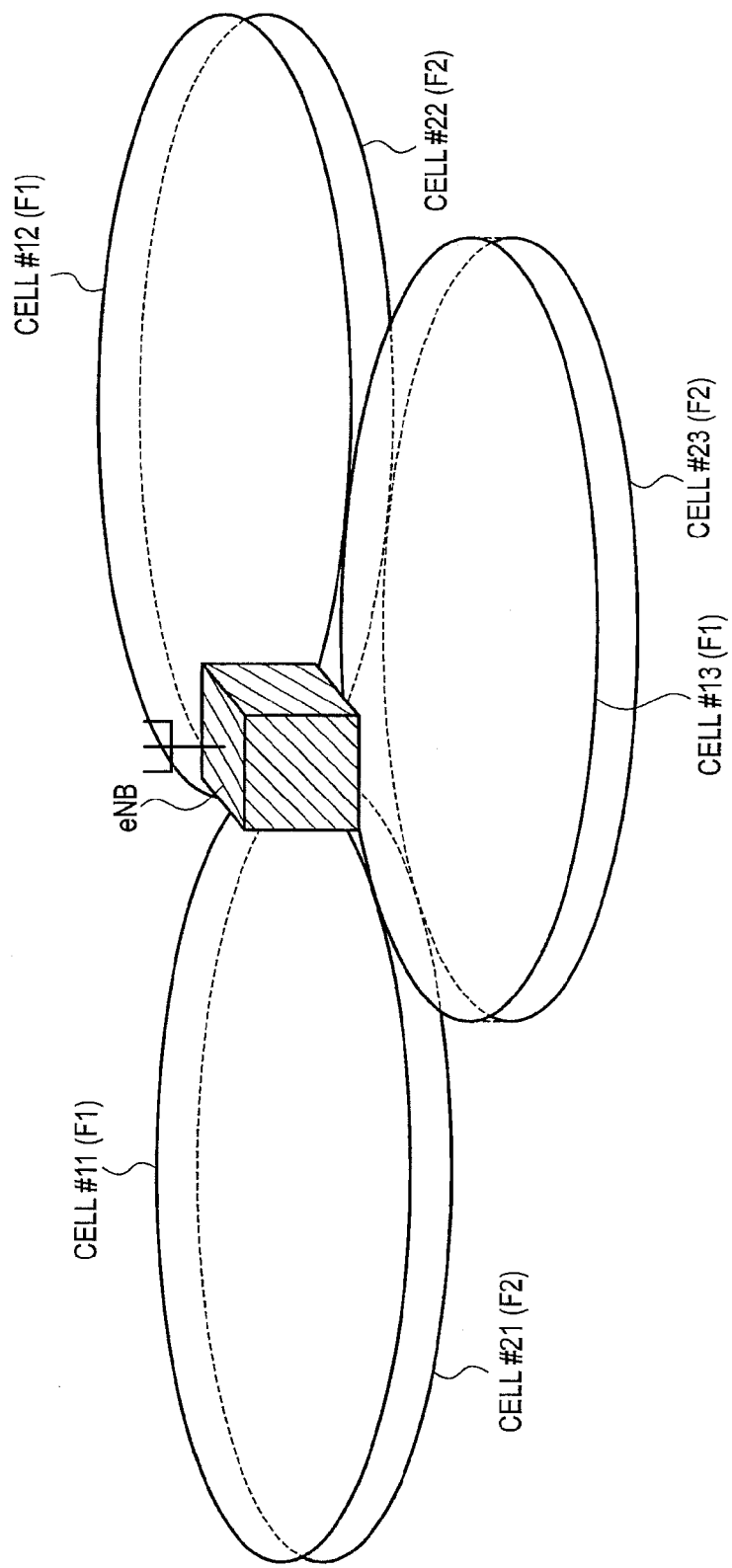
FIG. 4 is a diagram showing the entire configuration of a conventional mobile communication system.

With reference to FIG. 3, the mobile communication system according to a third embodiment of the present invention will be described. Hereinafter, the mobile communication system according to the present embodiment will be described by focusing on a difference from the mobile communication system according to the first embodiment of the present invention.

As illustrated in FIG. 3, in the mobile communication system according to the present embodiment, subordinate to the radio base station eNB, the cell #11, the cell #12, the cell #13, and the like are provided as macro cells, and a cell #21A, a cell #21B, a cell #22A, a cell #23A, a cell #23B and the like are provided as extended cells.

For example, configuration is such that the extended cell is provided to a specific area where it is expected to achieve high throughput by CA.

The CC of the frequency band F1 is used in the cell #11, the cell #12, and the cell #13, and the CC of the frequency band F2 is used in the cell #21A, the cell #21B, the cell #22A, the cell #23A, and the cell #23B.

Furthermore, in the mobile communication system according to the present embodiment, the cell #21A and the cell #21B are provided in a coverage area of the cell #11, the cell #22A is provided in a coverage area of the cell #12, and the cell #23A and the cell #23B are provided in a coverage area of the cell #13.

Furthermore, in the mobile communication system according to the present embodiment, different PCIs may be configured to be used in the cell #11 and the cells #21A and #21B having the superimposed coverage areas, different PCIs may be configured to be used in the cell #12 and the cell #22A having the superimposed coverage areas, and different PCIs may be configured to be used in the cell #13 and the cells #23A and #23B having the superimposed coverage areas.

Alternatively, in the mobile communication system according to the present embodiment, the same PCI may be configured to be used in the cell #11 and the cells #21A and #21B having the superimposed coverage areas, the same PCI may be configured to be used in the cell #12 and the cell #22A having the superimposed coverage areas, and the same PCI may be configured to be used in the cell #13 and the cell #23A having the superimposed coverage areas.

In addition, a range of PCI used in the cells #11, #12, and #13 may be different from a range of PCI used in the cells #21A, #21B, #22A, #23A, and #23B.

In the mobile communication system according to the present embodiment, it is possible for the mobile station UE to perform CA only in an area where the coverage area of the cell #11 and the coverage areas of the cells #21A and #21B are superimposed with each other, an area where the coverage area of the cell #12 and the coverage area of the cell #22A are superimposed with each other, and an area where the coverage area of the cell #13 and the coverage areas of the cells #23A and #23B are superimposed with each other.

Meanwhile, in the mobile communication system according to the present embodiment, the mobile station UE is configured to perform communication using only the CC of the frequency band F1, that is, configured not to perform the CA in a coverage area of the cell #11 where the coverage areas of the cells #21A and #21B are not superimposed, a coverage area of the cell #12 where the coverage area of the cell #22A is not superimposed, and a coverage area of the cell #13 where the coverage areas of the cells #23A and #23B are not superimposed.

In accordance with the mobile communication system according to the third embodiment of the present invention, while considering the propagation characteristics of CC of each frequency band, in areas where the coverage areas of the cells #11, #12, and #13 and the coverage areas of the cells #21A, #21B, #22A, #23A, and #23B are superimposed with each other, it is possible to achieve high throughput by the CA and to ensure wide coverage areas by the cells #11, #12, and #13 using the CC of the frequency band F1.

Furthermore, in accordance with the mobile communication system according to the third embodiment of the present invention, in particular, it is possible to improve throughput in a boundary area of each cell.

Note that in the mobile communication systems according to the above-mentioned first to third embodiments, the mobile station UE during communication may be configured to independently measure the CCs of the frequency bands F1 and F2, and report the measurement result to the radio base station eNB.

Furthermore, in the mobile communication systems according to the above-mentioned first to third embodiments, based on the measurement result in the CC of the frequency band F1 providing a coverage, configuration may be such that handover control is performed. Note that it is assumed that the CC of the frequency band F1 is an anchor carrier.

Here, among a plurality of "Component Carriers", the anchor carrier may be defined as a carrier on which a PDCCH (Physical Downlink Control Channel) signal is transmitted, a carrier on which a PHICH (Physical HARQ Indicator Channel) signal is transmitted, a carrier on which a downlink signal employing "Semi-persistent Scheduling" is transmitted, a carrier on which a PHICH signal for a PUSCH signal (an uplink data signal) is transmitted, a carrier on which a paging signal is transmitted, a carrier on which a DCCH (Dedicated Control Channel) signal is transmitted, or a carrier for which measurement is performed, wherein the PUSCH signal employs the "Semi-persistent Scheduling". Alternatively, the anchor carrier may be defined by a combination of the aforementioned definitions.

Furthermore, in the mobile communication systems according to the above-mentioned first to third embodiments, it may be configured such that based on the measurement result in the CC of the frequency band F2 providing throughput, the addition, deletion, or switching of the CC in the CA is controlled.

Furthermore, in the mobile communication systems according to the above-mentioned first to third embodiments, when detecting quality deterioration in the CC of the frequency band F2 (for example, when detecting RLF (Radio Link Failure)), the mobile station UE during communication may be configured to report the detection of the quality deterioration to the radio base station eNB using the CC of the frequency band F1.

Furthermore, in the mobile communication systems according to the above-mentioned first to third embodiments, when detecting the quality deterioration in the CC of the frequency band F2 (for example, when detecting RLF), the mobile station UE during communication may be configured to perform a reconnection process using PCI and C-RNTI (Cell-Radio Network Temporary Identity) related to a cell using the CC of the frequency band F1.

Furthermore, in the mobile communication systems according to the above-mentioned first to third embodiments, the mobile station UE during communication may be configured to allow the frequency of measurement in the CC of the frequency band F1, which is an anchor carrier, to be higher than the frequency of measurement in the CC of the frequency band F2 in order to guarantee mobility performance. Alternatively, requirements related to the measurement accuracy of the anchor carrier may be strictly defined as compared with requirements related to the measurement accuracy of CCs other than the anchor carrier.

Furthermore, in the mobile communication systems according to the above-mentioned first to third embodiments, a mobile station UE in an idle state may be configured to perform standby in the cell using the CC of the frequency band F1.

Furthermore, in the mobile communication systems according to the above-mentioned first to third embodiments, at the time of completion of communication, the radio base station eNB may be configured to perform "redirection instruction" such that the mobile station UE performs the standby in the cell using the CC of the frequency band F1.

Furthermore, in the mobile communication systems according to the above-mentioned first to third embodiments, the radio base station eNB may be configured not to broadcast information on the CC of the frequency band F2 as peripheral carrier information in the cell using the CC of the frequency band F1.

Furthermore, in the mobile communication systems according to the above-mentioned first to third embodiments, the radio base station eNB may be configured to set a flag of a "cell barring", which indicates that standby is not possible, by broadcast information in a cell using the CC of the frequency band F2.

Furthermore, in the mobile communication systems according to the above-mentioned first to third embodiments, the mobile station UE may be configured to establish an RRC connection in the cell using the CC of the frequency band F1, and then add the CC of the frequency band F2.

Furthermore, in the mobile communication systems according to the above-mentioned first to third embodiments, the radio base station eNB may be configured to preferentially notify the mobile station UE performing the CA of a scheduling signal related to the frequency bands F1 and F2 through PDCCH in the frequency band F2.

This is because the mobile station UE recognizes a range covered with the CC of the frequency band F2, so that it is efficient to notify the scheduling signal related to the frequency bands F1 and F2 through the PDCCH in the frequency band F2, instead of the PDCCH in the frequency band F1 over a wide range. The PDCCH in the frequency band F1 can be preferentially used for a mobile station UE in a place not covered with the frequency band F2.

Furthermore, in the mobile communication systems according to the above-mentioned first to third embodiments, the radio base station eNB may be configured to preferentially assign an RB (Resource Block) in the frequency band F2 to the mobile station UE performing the CA.

Furthermore, in the mobile communication systems according to the above-mentioned first to third embodiments, the radio base station eNB may be configured to preferentially assign a resource block in the frequency band F1 to a mobile station UE performing no CA.

The characteristics of the present embodiment as described above may be expressed as follows.

A first characteristic of the present embodiment is summarized in that a mobile communication system, in which a mobile station UE is configured to transmit and receive a signal to/from a radio base station eNB simultaneously using a first carrier of a frequency band F1 (a first frequency band) and a second carrier of a frequency band F2 (a second frequency band) higher than the frequency band F1, that is, the mobile station UE is configured to perform CA, wherein the radio base station eNB is configured to manage a cell #11 (a first cell) using the first carrier and cells #21, #21A, and #21B (second cells) using the second carrier, a coverage area of the cell #11 and coverage areas of the cells #21, #21A, and #21B are configured to be geographically superimposed with each other, and the coverage area of the cell #11 is configured to be larger than the coverage areas of the cells #21, #21A, and #21B (refer to FIG. 1 to FIG. 3).

In the first characteristic of the present embodiment, in the cell #11 and the cell #21 having the superimposed coverage areas, the same PCI (cell identification information) may be configured to be used in a scrambling process of a Primary-SCH signal and a Secondary-SCH signal (synchronization signals) (refer to FIG. 1).

In the first characteristic of the present embodiment, in the cell #11 and the cells #21, #21A, and #21B having the superimposed coverage areas, different PCIs may be configured to be used (refer to FIG. 2 to FIG. 3).

In the first characteristic of the present embodiment, the radio base station eNB includes a first antenna for communication in the cell #11 and a second antenna for communication in the cell #21, and may be configured to allow a main lobe direction of the first antenna to be different from a main lobe direction of the second antenna (refer to FIG. 2).

In the first characteristic of the present embodiment, a plurality of cells #21A and #21B may be provided in the coverage area of the cell #11.

It is noted that the operation of the above-described the mobile station UE or the radio base station eNB may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station UE or the radio base station eNB. Further, such a storage medium or a processor may be arranged, as a discrete component, in the mobile station UE or the radio base station eNB.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication system having a suitable configuration in which a high frequency band such as a 3.5 GHz band or a 4.9 GHz band can be effectively used by applying CA.

REFERENCE SIGNS LIST eNB . . . Radio base station
11, #12, #13, #21, #22, #23 . . . Marco cell
21A, #21B, #22A, #23A, #23B . . . Extended cell

The invention claimed is:

1. A mobile communication system, in which a mobile station is configured to perform CA (Carrier Aggregation) with a radio base station simultaneously using a first carrier of a first frequency band and a second carrier of a second frequency band higher than the first frequency band, wherein the radio base station is configured to manage a first cell using the first carrier and a second cell using the second carrier, a coverage area of the first cell and a coverage area of the second cell are configured to be geographically superimposed with each other, the coverage area of the first cell is configured to be larger than the coverage area of the second cell, and the first carrier is configured to provide a coverage and the second carrier is configured to not provide a coverage, wherein, in a non-overlapping coverage area, the mobile station is configured not to perform CA in the coverage area of the first cell where the coverage area of the second cell is not geographically superimposed with the coverage area of the first cell.

2. The mobile communication system according to claim 1, wherein, in the first cell and the second cell having the superimposed coverage areas, identical cell identification information is configured to be used in a scrambling process of a synchronization signal.

3. The mobile communication system according to claim 1, wherein, in the first cell and the second cell having the superimposed coverage areas, different cell identification information is configured to be used in a scrambling process of a synchronization signal.

4. The mobile communication system according to claim 1, wherein the radio base station includes a first antenna for communication in the first cell, and a second antenna for communication in the second cell, and is configured to allow a main lobe direction of the first antenna to be different from a main lobe direction of the second antenna.

5. The mobile communication system according to claim 1, wherein a plurality of second cells are provided in the coverage area of the first cell.

* * * * *